United States Patent
Bertz et al.

(10) Patent No.: US 9,948,597 B1
(45) Date of Patent: Apr. 17, 2018

(54) FACILITATING ACCESS OF A MOBILE DEVICE TO A WEB-BASED SERVICE USING A NETWORK INTERFACE

(71) Applicant: Sprint Communications Company L.P., Overland Park, KS (US)

(72) Inventors: Lyle T. Bertz, Lee's Summit, MO (US); Charles Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 898 days.

(21) Appl. No.: 13/782,762

(22) Filed: Mar. 1, 2013

(51) Int. Cl.
*H04L 29/12* (2006.01)
*H04L 29/08* (2006.01)
*H04L 29/06* (2006.01)

(52) U.S. Cl.
CPC .......... *H04L 61/10* (2013.01); *H04L 61/1511* (2013.01); *H04L 61/2015* (2013.01); *H04L 61/2514* (2013.01); *H04L 61/2578* (2013.01); *H04L 65/80* (2013.01); *H04L 67/322* (2013.01)

(58) Field of Classification Search
CPC ............. H04L 61/1511; H04L 61/2578; H04L 61/2567; H04L 61/2076; H04L 63/145; H04L 29/06027; H04L 29/12066; H04L 61/2015; H04L 61/2514; H04L 67/28; H04L 67/147; H04L 67/322
See application file for complete search history.

(56) References Cited

U.S. PATENT DOCUMENTS

| | | | |
|---|---|---|---|
| 6,968,389 B1* | 11/2005 | Menditto | H04L 61/1511 709/219 |
| 7,165,117 B1* | 1/2007 | Sitaraman | H04L 67/322 709/213 |
| 7,573,906 B2* | 8/2009 | Adamczyk | H04J 3/16 370/252 |
| 7,684,394 B1* | 3/2010 | Cutbill | H04L 61/1511 370/389 |
| 7,694,127 B2* | 4/2010 | Adams | H04L 61/2578 713/151 |
| 8,089,986 B2* | 1/2012 | Adamczyk | H04J 3/16 370/252 |
| 8,874,757 B2* | 10/2014 | Souza | 709/227 |
| 8,953,592 B2* | 2/2015 | Krishna | H04L 61/2517 370/389 |
| 9,049,247 B2* | 6/2015 | Holloway | H04L 61/1511 |
| 9,414,259 B2* | 8/2016 | Joy | H04W 28/02 |
| 2003/0046384 A1* | 3/2003 | Sirivara | H04L 67/42 709/224 |
| 2004/0228363 A1* | 11/2004 | Adamczyk | H04J 3/16 370/468 |
| 2004/0264439 A1* | 12/2004 | Doherty | H04L 61/1511 370/352 |

(Continued)

*Primary Examiner* — Ramy M Osman

(57) ABSTRACT

The invention is directed to methods and systems for facilitating access of a mobile device to web-based services. The web-based service sends identifying information, such as a public IP address and a port number, to a network interface. The network server, which has stored a mapping of the mobile device's private IP address to public IP address, is accessed to determine the private IP address of the mobile device. As the mobile device that requested access to the web-based service is now identified, the mobile device is now allowed to receive data from the web-based service.

17 Claims, 6 Drawing Sheets

(56) References Cited

U.S. PATENT DOCUMENTS

| | | | |
|---|---|---|---|
| 2005/0201370 A1* | 9/2005 | Poyhonen | H04L 61/2578 370/389 |
| 2008/0117869 A1* | 5/2008 | Freen | H04W 28/16 370/329 |
| 2008/0130653 A1* | 6/2008 | Chen | H04L 61/2514 370/395.2 |
| 2011/0022697 A1* | 1/2011 | Huh | H04L 43/0805 709/224 |
| 2011/0211439 A1* | 9/2011 | Manpuria | H04W 72/005 370/216 |
| 2011/0314086 A1* | 12/2011 | Finkelstein | H04L 65/103 709/203 |
| 2012/0131469 A1* | 5/2012 | Yamuna | H04L 67/02 715/736 |
| 2012/0147834 A1* | 6/2012 | Zisimopoulos | H04L 29/12066 370/329 |
| 2012/0214492 A1* | 8/2012 | Mihaly | H04W 76/041 455/437 |
| 2013/0265997 A1* | 10/2013 | Gu | H04W 76/022 370/338 |
| 2013/0301598 A1* | 11/2013 | Holm | H04L 61/304 370/329 |
| 2014/0092899 A1* | 4/2014 | Krishna | H04L 61/2517 370/389 |
| 2014/0359710 A1* | 12/2014 | Chaput | H04L 43/045 726/4 |
| 2015/0089061 A1* | 3/2015 | Li | H04L 61/1511 709/226 |
| 2015/0201394 A1* | 7/2015 | Qu | H04W 4/02 455/456.1 |

\* cited by examiner

FACILITATING ACCESS OF A MOBILE DEVICE TO A WEB-BASED SERVICE USING A NETWORK INTERFACE

SUMMARY

A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, a network interface, such as a 3GPP Rx interface, that receives identifying information corresponding to a mobile device from a web-based service. This information may include, at least, a public IP address that was previously assigned to the mobile device prior to the transmission of a request for data to the web-based service, and a port number associated with the request for data. In embodiments, an address translator, after assigning a public IP address to the mobile device, broadcasts the mapping of the private to public IP address so that an entry can be added to a network server, such as a domain name system (DNS) sever. Once the web-based service sends the identifying information to the network interface, the network can consult the network server to determine the mobile device's private IP address or other type of identifier to determine how to route the traffic from the web-based service.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
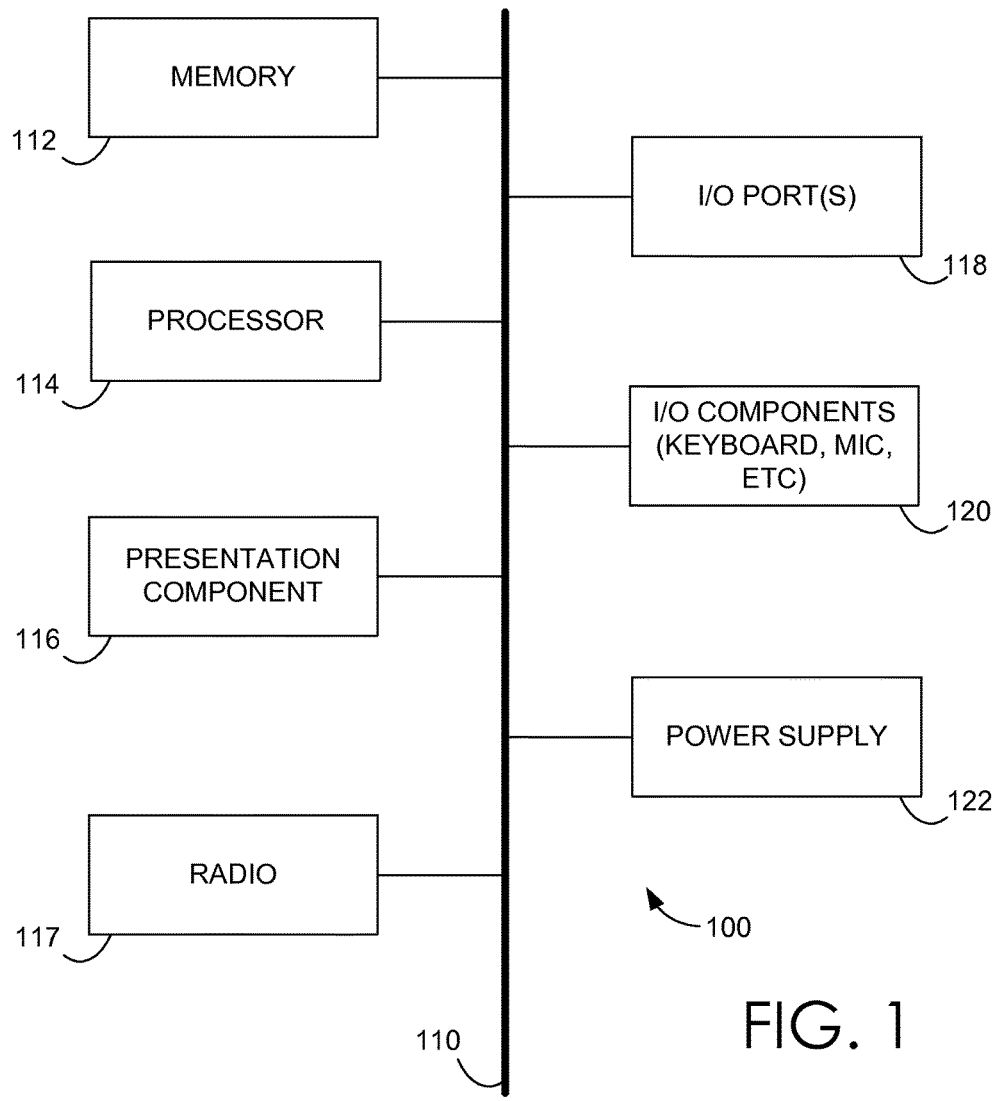
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
DNS Domain Name System
GPRS General Packet Radio Service
GSM Global System for Mobile communications (Groupe Spécial Mobile)
HTTP Hypertext Transfer Protocol
LED Light Emitting Diode
LTE Long-Term Evolution
NAPT Network Address and Port Translator
P-GW PDN Gateway
PCRF Policy Charging and Rules Function
PDA Personal Data Assistant
PDN Packet Data Network
PDSN Packet Data Serving Node
SAE System Architecture Evolution
TDD Time Division Duplexing
TDMA Time Division Multiple Access
UMTS Universal Mobile Telecommunications System Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward methods for facilitating access of a mobile device to a web-based service. For instance, the web-based service may be any application or program located outside of a wireless communications network associated with the mobile device. The mobile device may want to receive content from the web-based service, and as such, may send a request in the wireless communications network. An address translator may take the mobile device's private IP address and map it to a public IP address that can be sent outside of the network to protect the privacy of the mobile device's user. Instead of simply assigning a public IP address, the address translator (e.g., NAPT) may broadcast the mapping of the private to public IP address so that a network module, such as a plugin, may take this information and add an entry to a network server, such as a DNS server, with this information. The web-based service, when returning its data to the network, may send at least a public IP address and a port number to a network interface associated with the carrier, which allows a carrier service to access the network server to determine the private IP address of the mobile device to which the data from the web-based service is to be sent. Additionally, the web-based service may send through the network interface quality of service information, such as requests for particular enhanced experiences for the user of the mobile device.

In a first aspect of the present invention, computer-readable media having computer-executable instructions embodied thereon that, when executed, enable a computing device to perform a method of facilitating access of a mobile device to a web-based service are provided. The method includes receiving, through a network interface in a wireless communications network, identifying information associated with a mobile device from a web-based service from which the mobile device has requested data. The identifying information includes, at least, a public Internet protocol (IP) address previously assigned to the mobile device and a port number associated with the mobile device's request for the data. Further, the method includes accessing a network server that includes a mapping of the public IP address to a private IP address previously assigned to the mobile device, and from the network server, determining the private IP address associated with the mobile device. The mobile device is then allowed to receive the data from the web-based service.

In a second aspect of the present invention, a system for facilitating access of a mobile device to a web-based service is provided. The system includes an address translator that assigns a public Internet protocol (IP) address to a mobile device that is requesting access to a web-based service and that broadcasts a mapping of the public IP address to a private IP address associated with the mobile device to facilitate inclusion of the mapping in a network server. The system also includes the network server that stores an entry of the mapping of the public IP address to the private IP address associated with the mobile device, and a network interface that receives identifying information associated with the mobile device from the web-based service. The identifying information includes, at least, the public IP address associated with the mobile device and a port number associated with the requested access to the web-based service. The system further includes a carrier service that receives the identifying information from the network interface and based on the public IP address, accesses the network server to determine the private IP address associated with the mobile device, thereby enabling the mobile device to access the web-based service.

In a third aspect of the present invention, computer-readable media having computer-executable instructions embodied thereon that, when executed, enable a computing device to perform a method of facilitating access of a mobile device to a web-based service are provided. The method includes, in a wireless communications network, assigning a private Internet protocol (IP) address to a mobile device, and receiving an indication that the mobile device has requested to receive data from a web-based service. The method further includes translating the private IP address to a public IP address, broadcasting the translation of the private IP address to the public IP address, thus enabling a network module to add an entry to a network server that maps the private IP address to the public IP address for the mobile device, and receiving from the web-based service identifying information associated with the mobile device. The identifying information includes, at least, the public IP address and a port number associated with the request from the mobile device. The method also includes receiving from the web-based service one or more quality of service requests associated with the mobile device's request to receive the data from the web-based service, accessing the network server to determine the public IP address associated with the mobile device based on the public IP address and the port number, and allowing the mobile device to access the web-based service according to the one or more received quality of service requests.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Component 112A may be an application or code that is stored on device 100 that carries out one or more processes, as described herein. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
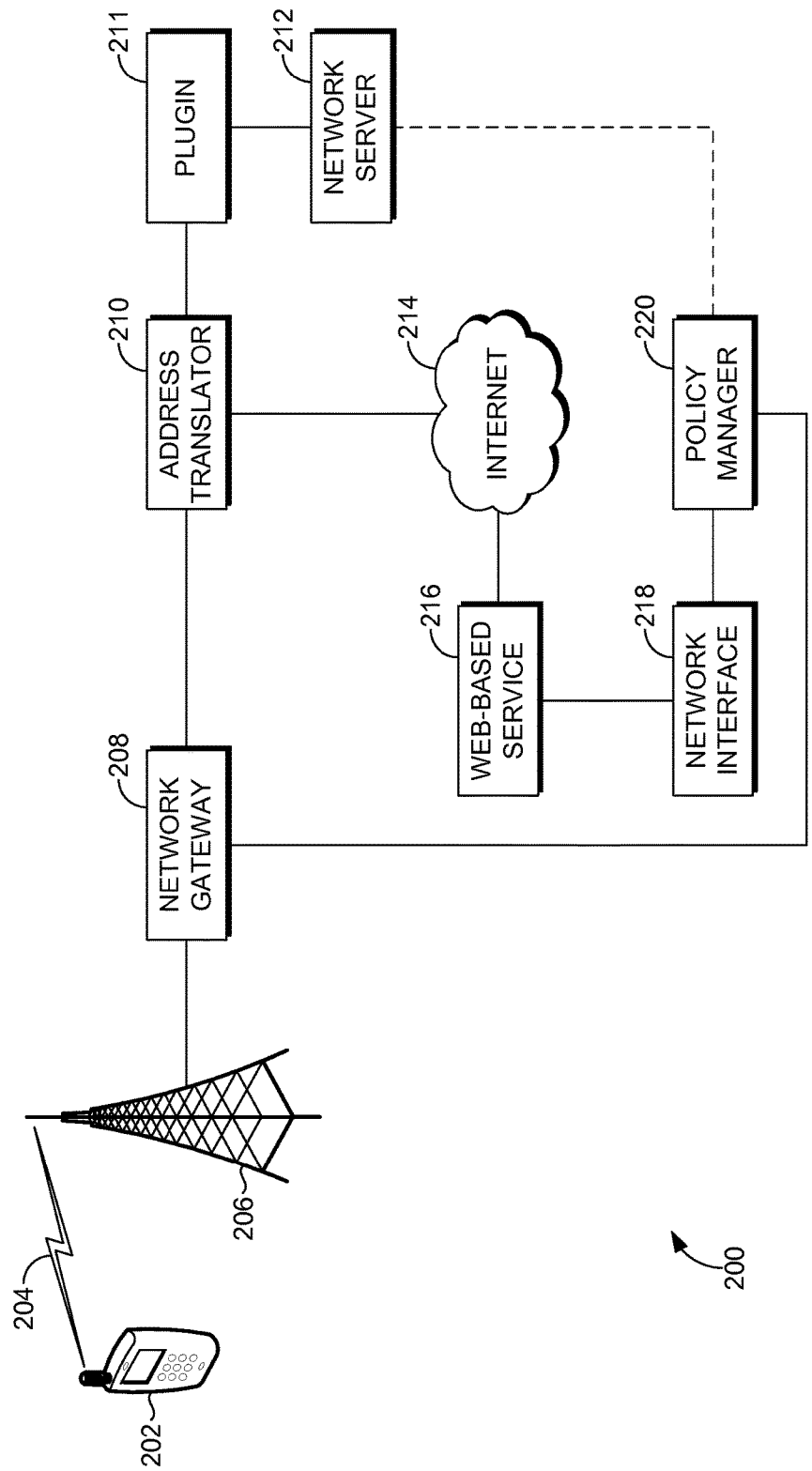
FIG. 2 depicts an illustrative operating system for carrying out embodiments of the present invention.

FIG. 2 depicts an illustrative operating environment, referenced generally by the numeral 200, and illustrates an illustrative networking environment that enables communication of data between a mobile device and a web-based service by way of a wireless communications network. The illustrative operating environment 200 shown in FIG. 2 is merely an example of one suitable operating environment and is not intended to suggest any limitation as to the scope of use or functionality of embodiments of the present invention. Neither should the operating environment 200 be interpreted as having any dependency or requirement related to any single module/component or combination of modules/components illustrated therein.

Mobile device 202, in one embodiment, is the type of device described in connection with FIG. 1 herein. The mobile device 202 may support multiple technologies such as CDMA 1×A, GPRS, EvDO, TDMA, GSM, WiMax technology, LTE, LTE Advanced, and the like. Alternatively, the mobile device 202 may support one type of technology, such as LTE (LTE and/or LTE Advanced). Any and all such aspects, and any combination thereof, are contemplated as being within the scope of the invention. The mobile device 202 may include a client application that helps carry out aspects of the technology described herein. The client application may be a resident application on the handset used by the mobile device to communicate data using embodiments of the present invention. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application is utilized by the mobile device to send and receive data through a wireless communications network. For instance, the mobile device 202 may wish to download content or other data from a web-based service. This data may be communicated to the mobile device 202 by way of the wireless communications network.

To access the wireless communications network, the mobile device 202 may be in communication with a base station (included within cell tower 206) via wireless-telecommunications links such as, for example, wireless-telecommunications link 204, which allows for data to be wirelessly communicated between the mobile device 202 and the cell tower 206. The mobile device 202 may communicate with the base station via the wireless-telecommunications link 204 to facilitate attachment of the mobile device 202 to the base station. Once attached, the mobile device 202 may also use the wireless-telecommunications link 204 to send and/or receive voice call information and/or data information as well as information concerning device capabilities. In one aspect, the mobile device 202 may utilize the wireless-telecommunications link 204 to send data session requests to the base station 208, such as to request access to (e.g., to receive data from) a web-based service.

The base station includes hardware and bandwidth(s) of a specified frequency. Although the term "base station" is used throughout this application, equivalent terms may include radio access node, eNodeB, and Node B. For example, if the wireless communications system utilizes LTE, the base station would be termed eNodeB. The hardware includes, for example, the actual radio mast or tower (item 206), as well as antennas, transceivers, GPS receivers, electrical power sources, digital signal processors, control electronics, and the like that are associated with the radio tower. The RF spectrum bandwidth may comprise one or more channels. With respect to this application, the term "channel" refers to an upload spectrum and a download spectrum.

Embodiments of the present invention may be used with different technologies or standards (CDMA 1×A, GPRS, EvDO, TDMA, GSM, WiMax technology, LTE, LTE Advanced).

The network gateway 208 is the link between the mobile device and the services that reside in an external packet network, such as IMS. In one embodiment, the network gateway 208 is a PDN gateway (P-GW). The network gateway 208 may be responsible for allocation of IP addresses to mobile devices, such as the mobile device 202, within the wireless communications network. Additionally, the mobile device may be connected to multiple network gateways depending on the types of services being used. Other important functions of the network gateway 208 are charging, packet filtering, and lawful interception. The network gateway 208 may act as the mobility anchor between 3GPP and non-3GPP networks, such as WiMAX.

The address translator 210 is generally responsible for assigning public IP addresses to mobile devices that are requesting access to web-based services outside of the wireless communications network. In one embodiment, the address translator 210 is a network address and port translator. This includes the process of modifying IP address information in IP packet headers while in transit across a traffic routing device. To avoid ambiguity, a one-to-many network address translator may alter higher level information, such as TCP/UDP ports in outgoing communications and must maintain a translation table so that return packets can be correctly translated back. Generally, as used herein, the address translator 210 maps a mobile device's private IP address assigned by the wireless communications network to a public IP address that the address translator 210 assigns to the mobile device. Typically, this is done to avoid sending any mobile device-specific information outside of the carrier's network for privacy and ambiguity purposes. In one embodiment, the address translator 210 broadcasts this mapping of public to private IP address so that other network modules can receive this broadcast and take appropriate action. For instance, in one embodiment, a plugin component 211 of the network receives the broadcast of the mapping, and accesses a server, such as network server 212 to store this information for future reference. In one instance, the network server 212 is a domain name system (DNS) server, but in other embodiments, it may be any other type of server used to store such information. While typically the public to private IP address mapping may not be stored within the wireless communications network for a particular mobile device when the mobile device 202 is requesting to access a web-based service, using embodiments of the present invention, this mapping is stored in a network server 212, such as a DNS sever. This allows other network modules to determine, at a later time (e.g., when the data from the web-based service is being routed to the mobile device), which mobile device 202 in the wireless communication network that should receive the data from the web-based service. As used herein, a web-based service is any application or program that is accessible via the Internet. The web-based service could be a gaming application, a weather application, a service operated by a law enforcement or other governmental agency, a social media site, a search site, or the like.

The request from the mobile device 202 for data from a web-based service is forwarded to the web-based service 216 through the Internet 214. Once the web-based service 216 processes the request, it may send identifying information to a network interface 218, which may be in communication with a policy manager 220 that determines how the data is to be treated. In one embodiment, the identifying information may include the public IP address associated with the mobile device 202 and the port number that corresponds to the mobile device's request for data. In one embodiment, the network interface 218 is a 3GPP Rx interface that receives the identifying information so that the information is received by the policy manager 220. In one instance, the policy manager 220, which may be a carrier service, may receive, through the network interface 218, quality of service information or requests from the web-based service. For example, the quality of service information may request for the data to be expedited, to have higher traffic rates, for the data to have a higher or lower priority, or any other enhanced experience that it requests. In one embodiment, the policy manager 220 is a policy charging and rules function (PCRF), which is a software node designated in real-time to determine policy rules in a network. The PCRF is part of the network architecture that aggregates information to and from the network, operational support systems, and other sources in real time, supporting creation of rules and automatically making policy decisions for subscribers on the network.

In one embodiment, once the policy manager 220 receives the identifying information and the quality of service requests from the web-based service 216 through the network interface 218, the policy manager 220 may access the network server 212 to look up the mapping of the public to private IP address to know how to route the data from the web-based service. In an LTE environment, the network may set up bearers according to the service requested. A bearer is a central element of the evolved packet system (EPS) quality of service concept. A bearer, as used herein, is a service that allows transmission of information signals between network interfaces. Each bearer is assigned one quality of service class identifier by the network. Once the bearers are set up, the mobile device may access the web-based service according to the quality of service parameters until the mobile device indicates that the session is to be terminated. At this point, resources are town down and the entries in the network server 212 may be deleted.

Figure 3:
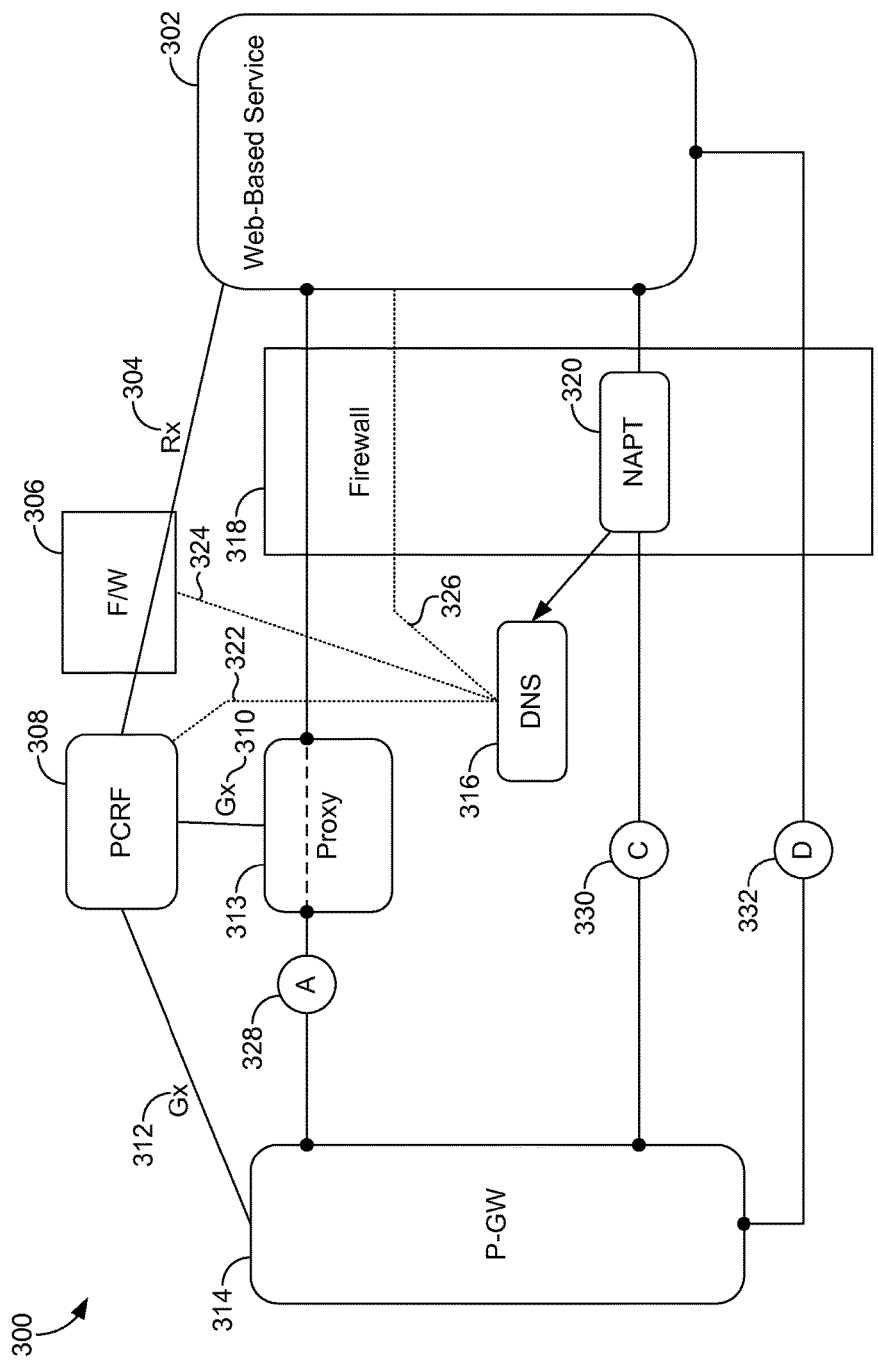
FIG. 3 depicts a design of illustrative components for carrying out embodiments of the present invention.

Turning to FIG. 3, a design of illustrative components for carrying out embodiments of the present invention is shown. FIG. 3 is a specific example of how embodiments of the present invention could work. As such, while particular components are used, embodiments of the present invention are not limited to such components, but are shown for exemplary purposes only. Initially, a web-based service 302 is illustrated. As mentioned, once the mobile device has requested access to the web-based service 302, identifying information, such as the public IP address of the mobile device and a port number are sent through a network interface, such as a 3GPP Rx interface 304, to a policy manager, such as a PCRF 308. In one embodiment, this information is also sent through a firewall 306 within the wireless communications network. The PCRF 308 may then communicate this identifying information and quality of service requests through a Gx interface 312 to the P-GW 314.

Data intended for the mobile device that requested the data, however, may be routed to the P-GW 314 in a number of different ways. For instance, flow A 328 illustrates that data is sent from the web-based service 302, through a firewall 318, also through a proxy 313, and to the P-GW 314. Here, traffic is sent to the proxy 313 that terminates the flow at Open Systems Interconnection (OSI) model layer 2 or above. The proxy 313 then creates a new connection to the web-based service 302 using the public IP address and port number. Flow A 328 may be used, for example, for child protection or content filtering. As indicated by flow C 330, the data is routed through the NAPT 320, which is able to access the DNS server 316, and then sends the data to the P-GW 314. Here, the traffic is passed through a firewall 318 performing NAPT 320. As shown by flow D, traffic is transmitted through the carrier without translation taking place. Other scenarios, such as VPN extension of private address spaces at the P-GW 314 to the web-based service 302 are not a typical arrangement.

In one embodiment, the web-based service 302 directly queries the DNS server 316 to determine where to route the date, and as such may determine the mobile device's private IP address. The web-based service 302 may not always be able to directly access the DNS server 316. Certain services, such as services owned or operated by law enforcement agencies or other governmental agencies, may have access to the DNS server 316 to determine the identity of a certain mobile device user. This allows fast access to identification information. As such, the DNS server 316 may be exposed to the PCRF 308, the web-based service 302, or even a sophisticated firewall 306 that integrated the lookup/routing logic.

Figure 4:
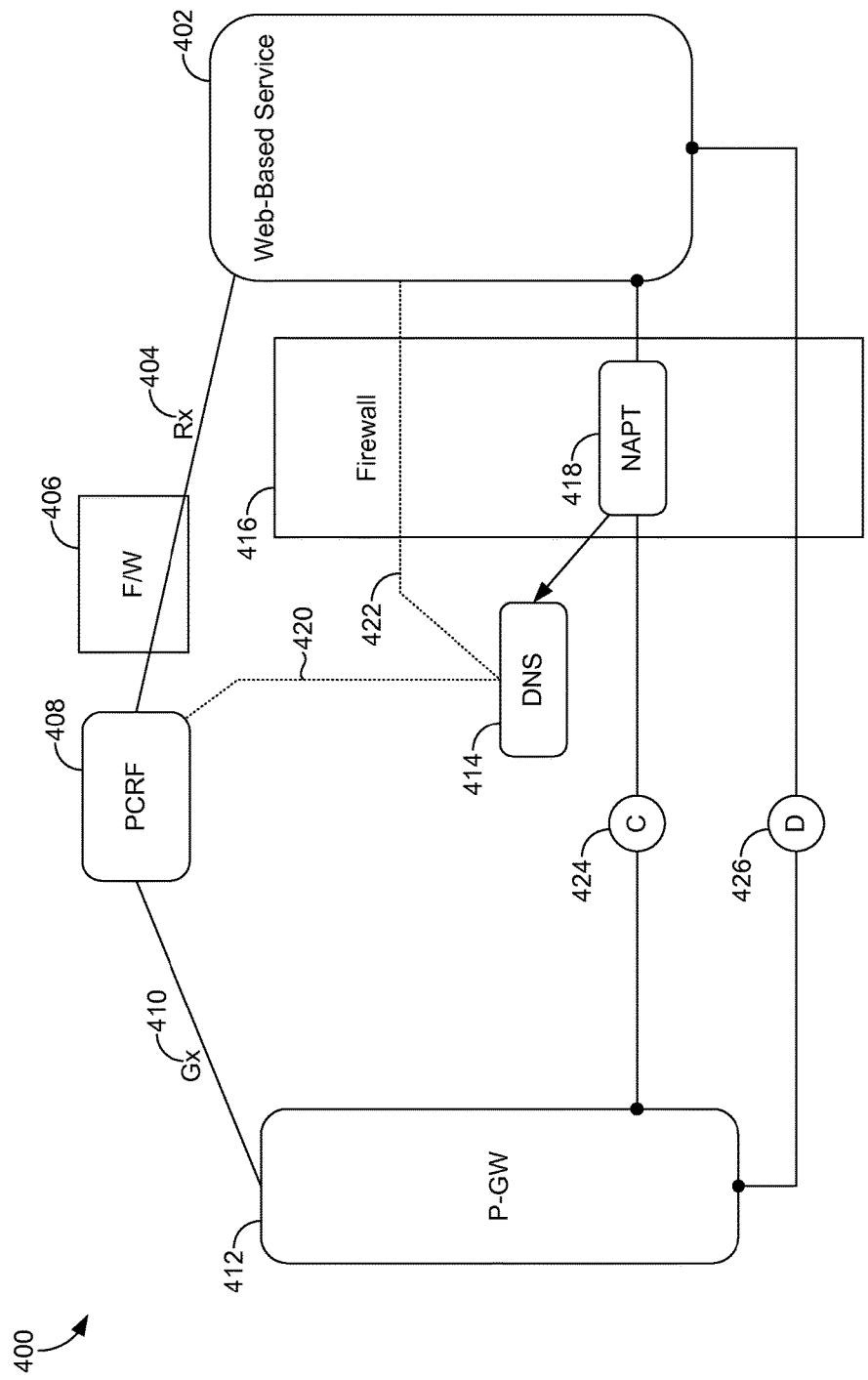
FIG. 4 depicts another design of illustrative components for carrying out embodiments of the present invention.

FIG. 4 depicts another design of illustrative components for carrying out embodiments of the present invention. FIG. 4 is similar to FIG. 3, but is simplified, in that the role of the proxy is implemented in the P-GW 412. As such, the web-based service 402 sends identifying information and quality of service requests through the 3GPP Rx interface 404 to the PCRF 408. In one embodiment, it is also sent through a firewall 406. The PCRF 408 then sends the information through a Gx interface 410 to the P-GW 412. Here, there are just two flow options. Flow C 424 is the same as described above with respect to FIG. 3, where traffic is sent through an NAPT 418, which can access the DNS server 414, and then forwarded on to the P-GW 412. Flow D 426 entails traffic being routed through the firewall 416 and to the P-GW 412. Here, the PCRF 408 and the web-based service 402 may access the DNS server 414 (items 420 and 422, respectively).

Figure 5:
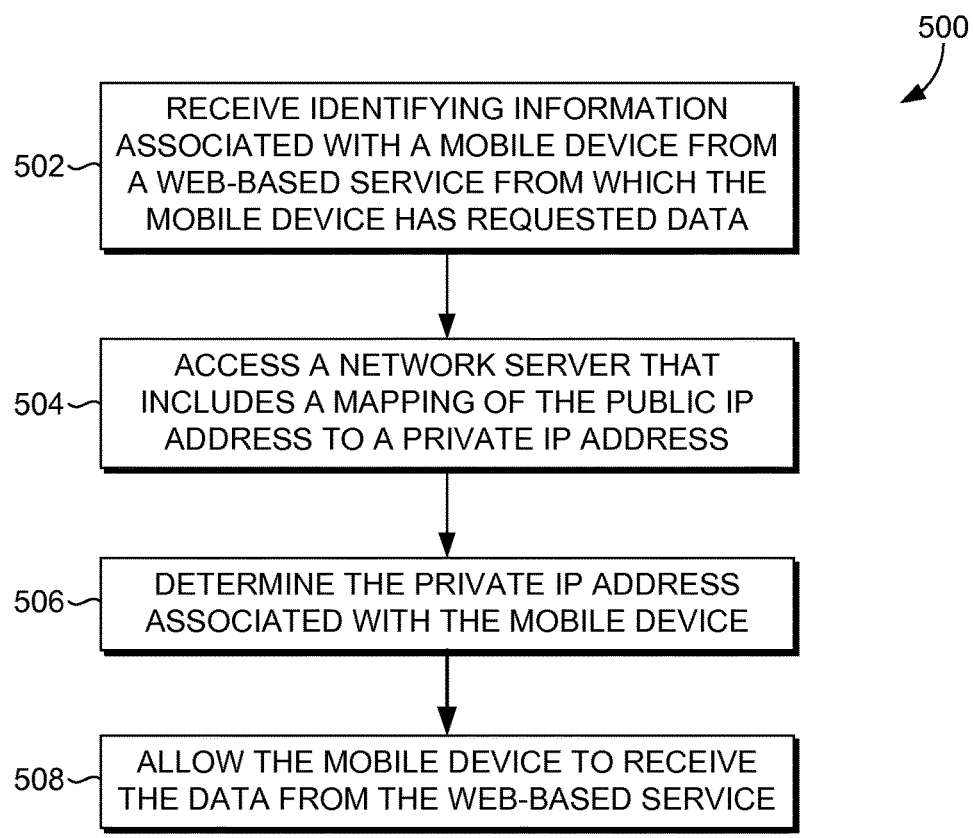
FIGS. 5-6 depict flowcharts illustrating methods for facilitating access of a mobile device to a web-based service in a wireless communications network, in accordance with embodiments of the present invention.

FIG. 5 depicts a flowchart illustrating a method 500 for facilitating access of a mobile device to a web-based service, in accordance with an embodiment of the present invention. In one embodiment, the wireless communications network described in method 500 utilized LTE technology. Initially, at step 502, identifying information associated with a mobile device is received from a web-based service from which the mobile device has requested data. The identifying information may include, for example, a public IP address previously assigned to the mobile device, such as before the request for data was sent to the web-based service by the wireless communications service, and a port number associated with the mobile device's request for data. In one instance, the receipt of identifying information from the web-based service may be provided in response to a request from the mobile device in a wireless communication network that was sent to the web-based service requesting access to the web-based service (e.g., requesting communication of data from the web-based service). In one embodiment, the web-based service, when it receives the request from the network, receives only a public IP address associated with the mobile device and not a private IP address or any other information that would specifically identify the mobile device or its user. As the web-based service knows the public IP address of the mobile device, it may use this address to determine with which carrier the mobile device is associated, and thus can determine the network interface to which to send the identifying information.

In one embodiment, the web-based service also sends one or more quality of service requests associated with the mobile device's request to receive the data from the web-based service. These quality of service requests may comprise any requests that can be used to enhance the user experience, such as, but not limited to priority, expedited transmission of data, higher traffic rates, etc.

Prior to the request being sent to the web-based service, an address translator, such as an NAPT, may have translated the mobile device's private IP address into a public IP address so that the public IP address is sent out of the network instead of the private IP address or other identification associated with the mobile device. The NAPT, in embodiments of the present invention, broadcasts the mapping of the public to the private IP address for other network modules. For instance, in one embodiment, the NAPT, which typically does not broadcast this mapping, does broadcast the mapping so that a plugin component in the network can take this information and initiate the addition of an entry in a network server, such as a DNS server. The new entry in the DNS server is a mapping of the mobile device's public to private IP address. In one instance, the DNS entry may also include a port number associated with the mobile device's request for date from the web-based service. The port number uniquely identifies different applications or processes running on a computing device and thereby enables them to share a single physical connection to a packet-switched network, like the Internet.

At step 504, a network server is accessed that includes a mapping of the public IP address to a private IP address. As mentioned, the broadcast from the address translator (e.g., NAPT) may result in a plugin component or some other network module adding an entry in the network server (e.g., DNS server) with the mapping of the public to private IP address. The private IP address associated with the mobile device is then determined at step 506 once the network server is accessed. This allows the network to know to which mobile device the data is to be sent. At step 508, the mobile device is allowed to receive the data from or to otherwise access the web-based service. Upon termination of the communications session that includes the mobile device accessing the web-based service, the entry in the network server that includes the mapping of the public to the private IP address may be deleted, as it will no longer be needed, nor will it likely be accurate upon initiation of a new communications session for the mobile device, as a different public IP address will likely be assigned to the mobile device.

Figure 6:
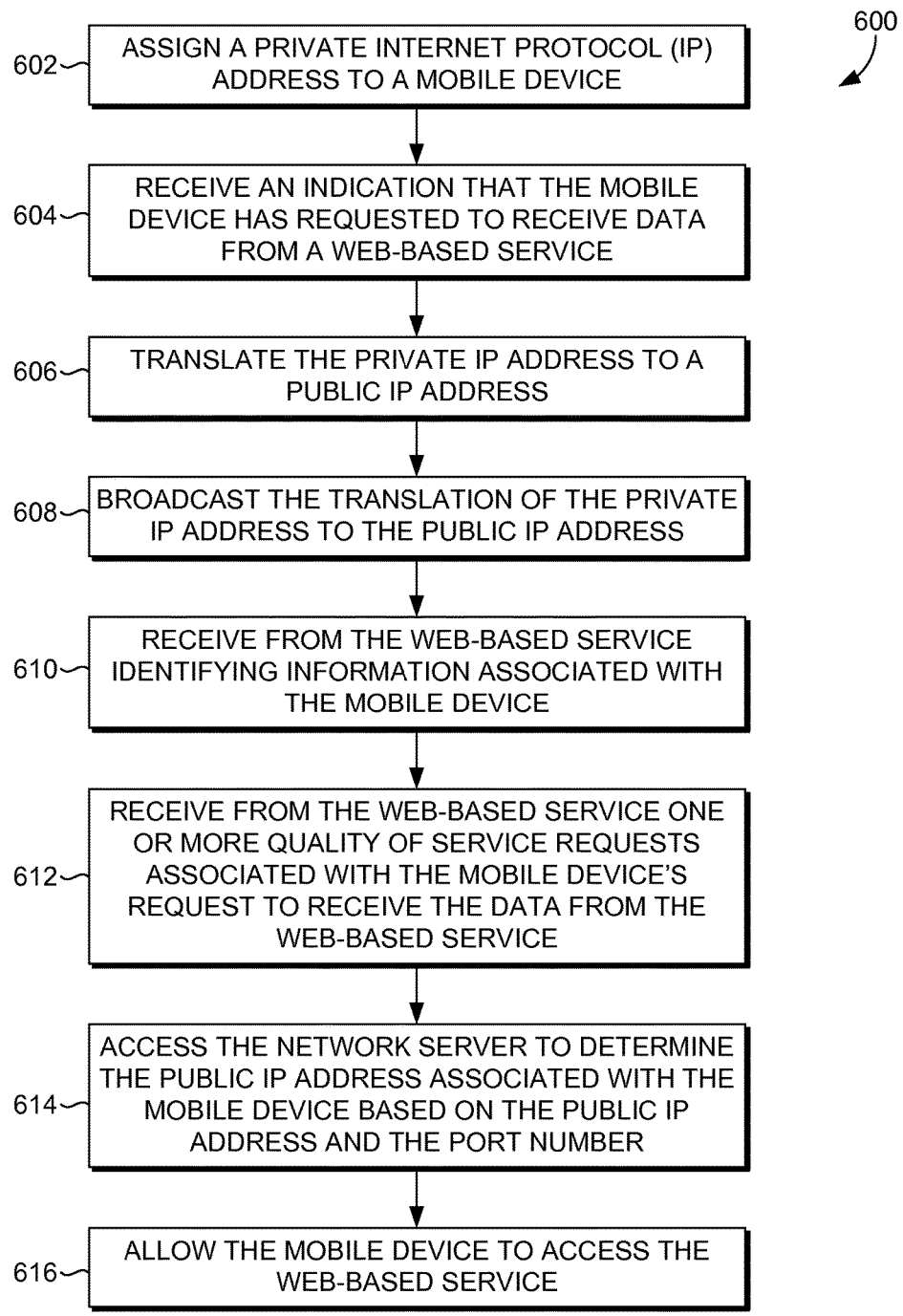

Turning now to FIG. 6, a flowchart is depicted illustrating a method 600 for facilitating access of a mobile device to a web-based service, in accordance with an embodiment of the present invention. At step 602, a private IP address is assigned to a mobile device in a wireless communications network. In one embodiment, a network gateway component (e.g. P-GW) assigns the private IP address to the mobile device when the mobile device attempts to connect to the wireless communications network. At step 604, an indication is received that the mobile device has requested to receive data from a web-based service. This indication may be received, for example, at an address translator (e.g., NAPT), that translates the mobile device's private IP address to a public IP address at step 606. At step 608, the translation of the private to public IP address is broadcasted, such as by the address translator. This enables a network module (e.g., plugin) to add an entry to a network server (e.g., DNS server). The entry includes a mapping of the public to private IP address. In one embodiment, the request from the mobile device is sent through a firewall before it leaves the network to the web-based services. At step 610, identifying information associated with the mobile device is received from the web-based service, for example, at a network interface. In one embodiment, the network interface is a 3GPP Rx interface. The identifying information may include, at least, the public IP address and a port number associated with the mobile device's request to access the web-based service.

At step 612, one or more quality of service requests associated with the mobile device's request to receive the data from the web-based service are received from the web-based service. At step 614, the network server is a accessed to determine the private IP address associated with the mobile device based on the public IP address and the port number. The mobile device is then allowed to access the web-based service at step 616. In one embodiment, an indication is received that the mobile device no longer wants to receive the data from the web-based service. Here, the mobile device would not be allowed to access the web-based service. Additionally, the entry added to the network server may be deleted.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, enable a computing device to perform a method of facilitating access of a mobile device to a web-based service, wherein the web-based service is an online content provider application or program located outside of a wireless communications network associated with the mobile device, the method comprising, in the wireless communications network:

receiving, through a network interface, identifying information associated with the mobile device from the web-based service from which the mobile device has requested content, and wherein the identifying information includes, at least, a public Internet protocol (IP) address previously assigned to the mobile device and a port number associated with the mobile device's request for the content;

further receiving, from the web-based service, one or more quality of service requests associated with the mobile device's request to receive the content from the web-based service;

accessing a network server, wherein the network server includes a mapping of the public IP address to a private IP address previously assigned to the mobile device to determine the private IP address associated with the mobile device; and using the private IP address to allow the mobile device to receive the content from the web-based service according to the received one or more quality of service requests in the wireless communications network, wherein the one or more quality of service requests comprise one or more parameters for enhancing a user's experience of the content by communicating the content to the mobile device with one or more of an expedited transmission of data, higher traffic rates, or priority of transmission of data.

2. The media of claim 1, wherein the network interface is a 3GPP Rx interface.

3. The media of claim 1, wherein an address translator assigns the public IP address to the mobile device and broadcasts the mapping of the public IP address to the private address for receipt by at least a network module that adds an entry to the network server with the mapping of the public IP address to the private IP address for the mobile device.

4. The media of claim 3, wherein the network module is a plugin.

5. The media of claim 1, wherein the wireless communications network utilizes LTE technology.

6. The media of claim 1, further comprising upon termination of a communications session of the mobile device that includes access to the web-based service, deleting the entry in the network server of the mapping of the public IP address to the private IP address of the mobile device.

7. The media of claim 1, wherein the web-based service is sent the public IP address but not the private IP address associated with the mobile device by the wireless communications network.

8. The media of claim 1, wherein the service identifies the network interface to which to send the identifying information based on a carrier associated with the public IP address.

9. The media of claim 1, wherein the network server is a domain name system (DNS) server.

10. A system for facilitating access of a mobile device to a web-based service, the system comprising:
   an address translator that assigns a public Internet protocol (IP) address to the mobile device that is requesting access to the web-based service and that broadcasts a mapping of the public IP address to a private IP address associated with the mobile device to facilitate inclusion of the mapping in a network server, wherein the web-based service is a content provider application or program located outside of a wireless communications network associated with the mobile device;
   the network server that stores an entry of the mapping of the public IP address to the private IP address associated with the mobile device;
   a network interface that receives identifying information associated with the mobile device from the web-based service, wherein the identifying information includes, at least, the public IP address associated with the mobile device and a port number associated with the requested access to the web-based service; and
   a carrier service that receives the identifying information from the network interface and based on the public IP address, accesses the network server to determine the private IP address associated with the mobile device, thereby enabling the mobile device to access the web-based service according to one or more quality of service requests received from the web-based service, wherein the one or more quality of service requests comprise one or more parameters for enhancing a user's experience of a requested content by communicating the requested content to the mobile device with one or more of an expedited transmission of data, higher traffic rates, or priority of transmission of data.

11. The system of claim 10, further comprising a network module that receives the broadcast from the address translator, the broadcast including the mapping of the public IP address to the private IP address for the mobile device.

12. The computer-readable media of claim 11, wherein the network module is a plugin.

13. The system of claim 11, wherein once the network module receives the broadcast, the network module adds a new entry into the network server with the mapping of the public IP address to the private IP address for the mobile device.

14. One or more non-transitory computer-readable media having computer-executable instructions embodied thereon that, when executed, enable a computing device to perform a method of facilitating access of a mobile device to a web-based service, the method comprising, in a wireless communications network:
   assigning a private Internet protocol (IP) address to the mobile device;
   receiving an indication that the mobile device has requested to receive content from the web-based service, wherein the web-based service is a content provider application or program located outside of a wireless communications network associated with the mobile device;
   translating the private IP address to a public IP address;
   broadcasting the translation of the private IP address to the public IP address, thus enabling a network module to add an entry to a network server that maps the private IP address to the public IP address for the mobile device;
   receiving from the web-based service identifying information associated with the mobile device, the identifying information including, at least, the public IP address and a port number associated with the request from the mobile device;
   receiving from the web-based service one or more quality of service requests associated with the mobile device's request to receive the data from the web-based service;
   accessing the network server to determine the private IP address associated with the mobile device based on the public IP address and the port number; and
   using the private IP address to allow the mobile device to access the web-based service according to the one or more received quality of service requests, wherein the one or more quality of service requests comprise one or more parameters for enhancing a user's experience of a requested content by communicating the requested content to the mobile device with one or more of an expedited transmission of data, higher traffic rates, or priority of transmission of data.

15. The media of claim 14, wherein the request from the mobile device to receive the data from the web-based service is sent through a firewall in the wireless communications network to the web-based service.

16. The media of claim 14, further comprising:
   receiving an indication that the mobile device no longer wants to receive the data from the web-based service; and
   not allowing the mobile device to access the web-based service.

17. The media of claim 16, further comprising deleting the entry stored in the network server of the mapping of the private IP address to the public IP address for the mobile device.

* * * * *